US007014418B1

(12) United States Patent
Arnold et al.

(10) Patent No.: US 7,014,418 B1
(45) Date of Patent: Mar. 21, 2006

(54) MULTI-STAGE COMPRESSOR AND HOUSING THEREFOR

(75) Inventors: Steve Don Arnold, Ranch Palos Verdes, CA (US); Kristian N. Dullack, Carson, CA (US); David A. Calta, Redondo Beach, CA (US); Glenn F. Thompson, Palos Verdes Estates, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/004,467

(22) Filed: Dec. 3, 2004

(51) Int. Cl.
*F01D 25/24* (2006.01)

(52) U.S. Cl. ............... 415/100; 415/204; 415/206; 415/211.2

(58) Field of Classification Search ............... 415/1, 415/99, 100, 204, 206, 211.2
See application file for complete search history.

(56) References Cited

U.S. PATENT DOCUMENTS 2,407,987 A * 9/1946 Landberg ............... 415/94
5,697,767 A * 12/1997 Bissell et al. ............ 417/350
6,062,028 A * 5/2000 Arnold et al. ............ 60/612

* cited by examiner

*Primary Examiner*—Ninh H. Nguyen
(74) *Attorney, Agent, or Firm*—Chris James (57) ABSTRACT

A multi-stage compressor and associated compressor housing and method are provided. The housing defines an aperture for receiving a compressor wheel for successively compressing a gas in first and second stages. First- and second-stage inlets are fluidly connected to the aperture in generally axial directions, and first- and second-stage volutes extend at least partially annularly therearound so that each volute is configured to receive gas flowing generally radially outward from the compressor wheel. In addition, first and second passages fluidly connect the first-stage volute to the second-stage inlet. Each passage extends from the first-stage volute to a position radially outward of the second-stage volute and therefrom to the second-stage inlet at an axial position opposite the second-stage volute from the first-stage volute. Thus, the gas can be received through the first-stage inlet, compressed by the wheel, circulated to the second-stage inlet via the first-stage volute and the passages, compressed again by the wheel, and delivered to the second-stage volute.

7 Claims, 8 Drawing Sheets

MULTI-STAGE COMPRESSOR AND HOUSING THEREFOR

FIELD OF THE INVENTION

The present invention relates generally to a multi-stage compressor and, more particularly, to a two-stage centrifugal or radial-flow compressor with first- and second-stage volutes for successively delivering gas through the stages of the compressor and thereby sequentially compressing the gas in multiple stages.

BACKGROUND OF THE INVENTION

Compressors, such as those used in turbochargers, typically include a compressor wheel that is rotatably mounted in a housing and that defines blades extending radially outward in proximity to an inner surface of the housing. The housing defines an inlet for receiving air or other gas in an axial direction, and an annular diffuser extends circumferentially around the wheel to receive the air in a radial direction therefrom. A volute, disposed radially outward from the diffuser, is structured to receive the air from the diffuser. During operation, the air is compressed by the rotation of the blades of the compressor wheel and delivered radially outward through the diffuser to the volute. The compressor wheel is normally rotated at a high speed, such that the air is moved at a high velocity to the diffuser, which then slows the air and increases the static pressure of the air. In the volute, which provides a relatively large volume compared to the diffuser, the velocity of the air is further reduced and the static pressure of the air is also increased.

In the case of a compressor with multiple sequential stages, the air can be compressed to a first pressure in a first stage and then further compressed to a higher pressure in a second stage. For example, U.S. Pat. No. 6,062,028 to Arnold, et al., issued May 16, 2000 and assigned to the assignee of the present application, describes a "Low Speed High Pressure Ratio Turbocharger," which can have a two-stage compressor with back-to-back radial flow compressor wheels with integral air flow ducting. The rotational speed of the turbocharger can be reduced and/or the pressure ratio can be increased relative to single-stage devices.

While conventional two-stage compressors have been proven to be effective and to provide advantages over some single-stage compressors, there exists a continued need for an improved compressor that can be used to sequentially compress gas in multiple stages. In particular, the compressor should provide a smooth flow of gas from the outlet of the first stage to the inlet of the second stage, preferably while reducing the swirling of the gas exiting the first stage and/or while reducing the transfer of thermal energy between the gas exiting the second stage and the air flowing from the first stage to the second stage.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
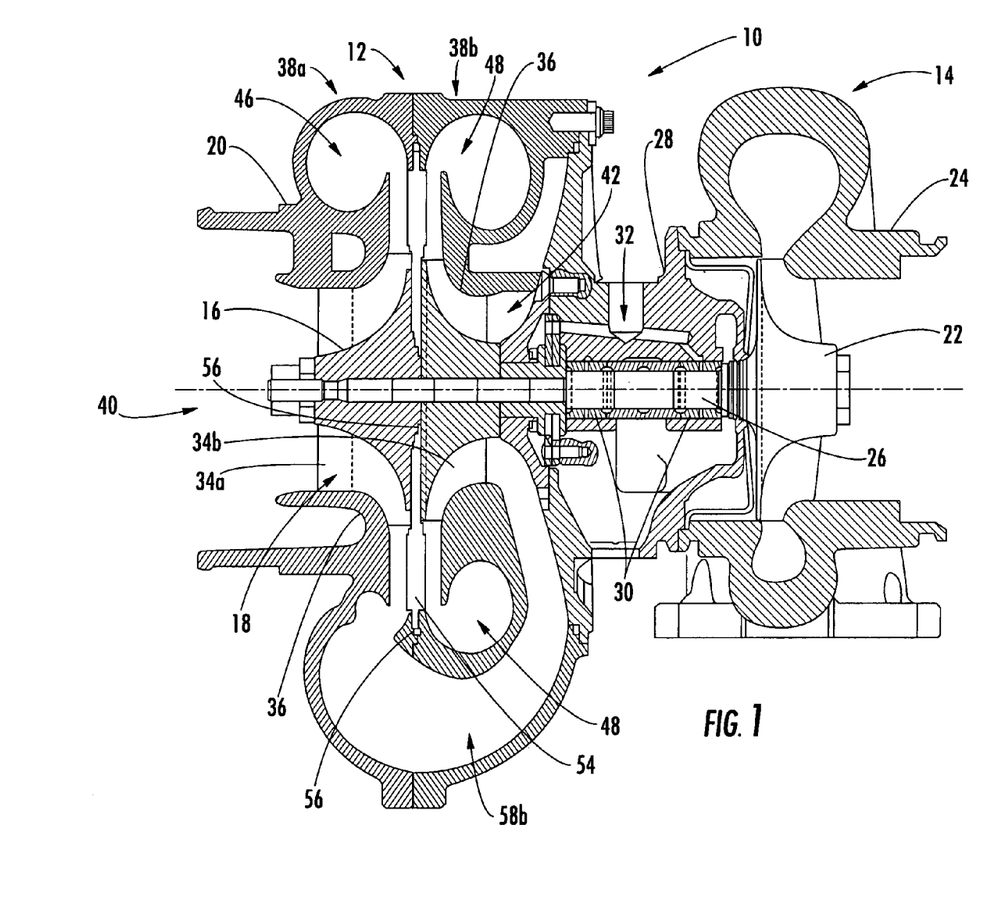
FIG. 1 is a section view illustrating a turbocharger having a multi-stage compressor according to one embodiment of the present invention.

Referring to FIG. 1, there is shown a turbocharger 10 having a multi-stage compressor 12 according to one embodiment of the present invention. The compressor 12 includes a compressor wheel 16 rotatably mounted in a cavity or aperture 18 defined by a body of a compressor housing 20. The turbocharger 10 includes a turbine 14 having a turbine wheel 22 that is disposed in a turbine housing 24. The compressor wheel 16 is connected to the turbine wheel 22 by a shaft 26 that extends in an axial direction therebetween. As shown in FIG. 1, the shaft 26 is rotatably mounted in a center housing 28 between the compressor 12 and the turbine 14 and supported by bearings 30 in the center housing 28. The center housing 28 can also define one or more passages 32 for receiving and circulating a flow of oil for lubrication and cooling.

The turbocharger 10 is configured to extract energy from the exhaust gas of an internal combustion engine (not shown). In particular, the turbine wheel 22 can be rotated by a flow of the exhaust gas through the turbine housing 24, thereby rotating the shaft 26 so that the compressor wheel 16 compresses air flowing through the compressor housing 20 and delivers the compressed air to an intake of the engine (not shown). While one embodiment of a turbocharger 10 is illustrated in FIG. 1, it is appreciated that other configurations of turbochargers can be used in accordance with the present invention. Further, in other embodiments of the present invention, the compressor 12 can be used to compress other gases, which can be used for other purposes, and in conjunction with devices other than turbochargers.

A plurality of blades 34a, 34b extend radially outward from the compressor wheel 16, and the blades 34a, 34b extend proximate to a contoured inner surface 36 of the housing 20 so that the compressor wheel 16 can be used to compress and deliver air or other gas through the housing 20. More particularly, the compressor 12 includes first and second stages 38a, 38b for successively compressing the air or other gas, typically to a first pressure in the first stage 38a and then to a higher, second pressure in the second stage 38b. In this way, the compressor 12 can generally achieve higher pressure than a conventional single-stage compressor and/or with lower rotational speeds of operation.

The compressor 12 can include multiple compressor wheels for successively compressing the gas, such as first and second wheels corresponding to first and second stages of compression, and the wheels can be configured in similar or dissimilar configurations along the same or different axes of rotation. Alternatively, as shown in FIG. 1, the single compressor wheel 16 can define different portions corresponding to the different stages of compression. That is, the compressor wheel 16 can define a first set of the blades 34a that is disposed in the first stage 38a of the compressor 12 and a second set of the blades 34b that is disposed in the second stage 38b of the compressor 12. The blades 34a, 34b extend radially outward and are directed in the axial direction of the compressor 12. In particular, the first set of blades 34a is directed in a first axial direction toward a first-stage inlet 40 of the compressor housing 20, and the second set of blades 34b is directed in an opposite, second axial direction toward a second-stage inlet 42 of the compressor housing 20.

As shown in FIGS. 1–8, the first and second stages 38a, 38b of the compressor 12 define a "back-to-back" configuration, with the first-stage inlet 40 and second-stage inlet 42 being directed in opposite axial directions. That is, the compressor wheel 16 is configured to receive gas into the first-stage inlet 40 in a first direction and into the second-stage inlet 42 in a generally opposing, collinear direction. Gas is circulated from the first stage 38a of the compressor 12 to the second stage 38b as described further below. Thereafter, the gas can be discharged from the second stage 38b via a second-stage outlet 44, which can extend in a generally tangential direction toward an inlet of an internal combustion engine or the like.

Figure 5:
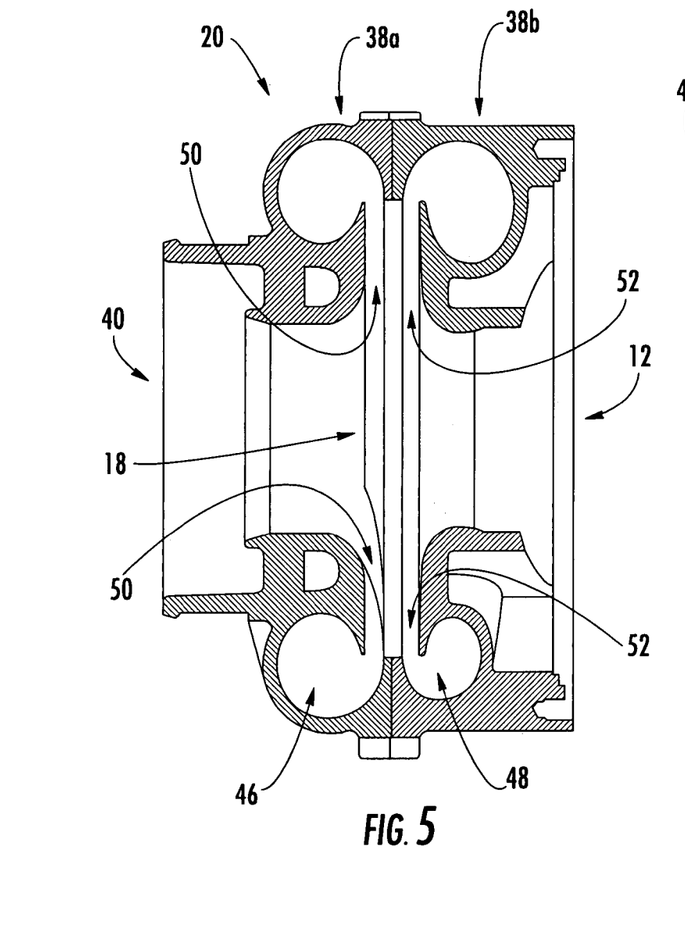
FIG. 5 is a section view illustrating the compressor housing of FIG. 2, as seen along line 5—5 of FIG. 2.
Figure 8:
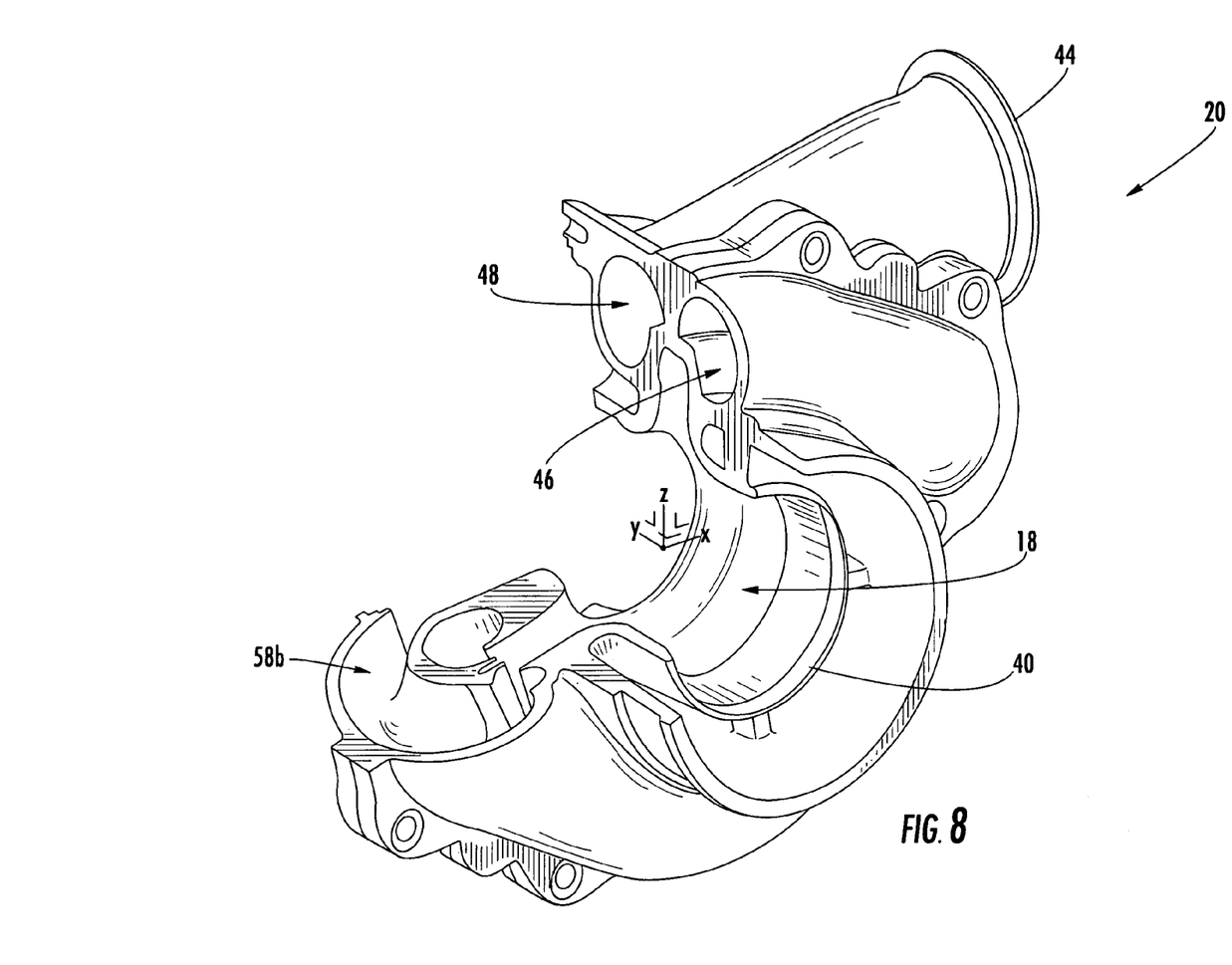
FIG. 8 is a partially cut-away view illustrating the compressor housing of FIG. 2.

As shown, e.g., in FIGS. 5 and 8, the compressor housing 20 defines first- and second-stage volutes 46, 48 corresponding to the first- and second-stages 38a, 38b of the compressor 12. Each of the volutes 46, 48 is configured to receive the gas from the respective set of blades 34a, 34b of the compressor wheel 16 in a generally radially outward direction via a diffuser 50, 52. That is, a first-stage diffuser 50 defined by the housing 20 extends circumferentially around the first set of blades 34a and fluidly connects the aperture 18 to the first-stage volute 46. Similarly, a second-stage diffuser 52 defined by the housing 20 extends circumferentially around the second set of blades 34b and fluidly connects the aperture 18 to the second-stage volute 48. Thus, each stage 38a, 38b of the compressor 12 is configured to receive gas in a generally axial direction and deliver the gas in a generally radial direction outward through the respective diffuser 50, 52 and into the respective volute 46, 48.

The first and second diffusers 50, 52 are separated by a baffle 54 or seal plate (FIG. 1). The baffle 54 is typically configured to remain stationary relative to the housing 20 such that the compressor wheel 16 rotates adjacent to the baffle 54, though in other cases the baffle 54 can rotate with the wheel 16. In any case, seals 56 can be provided between the baffle 54 and the wheel 16 and/or the housing 20 to prevent gas from flowing directly between the diffusers 50, 52 or the volutes 46, 48.

Figure 2:
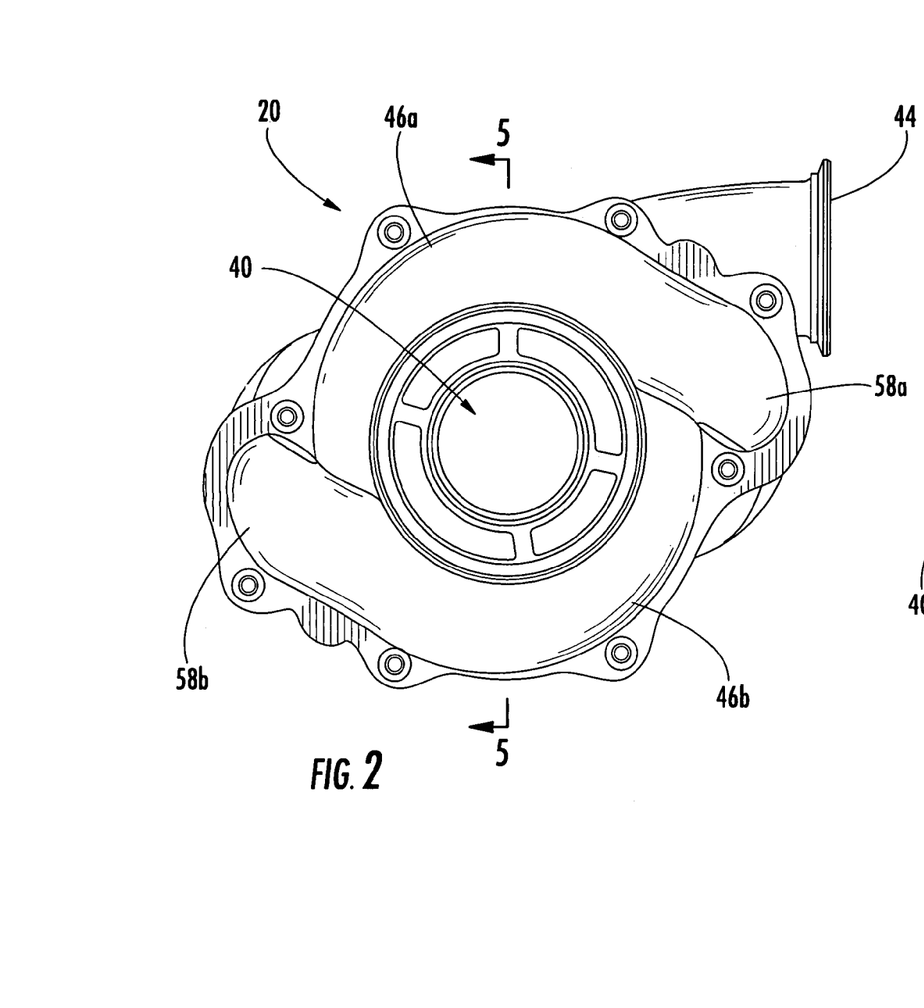
FIG. 2 is an elevation view illustrating the compressor housing of the turbocharger of FIG. 1.
Figure 3:
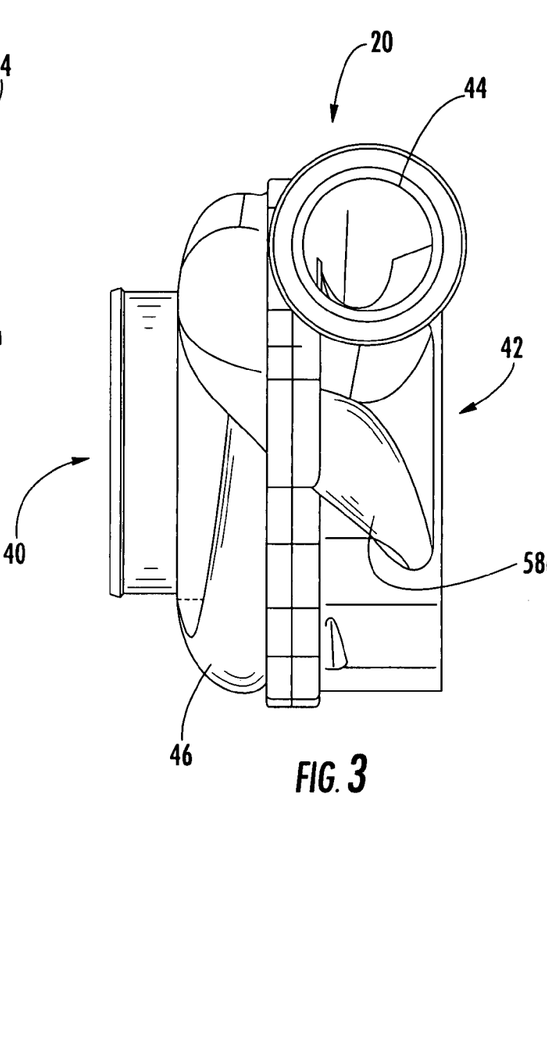
FIG. 3 is an elevation view illustrating the compressor housing of FIG. 2, as seen from the right side of FIG. 2.
Figure 4:
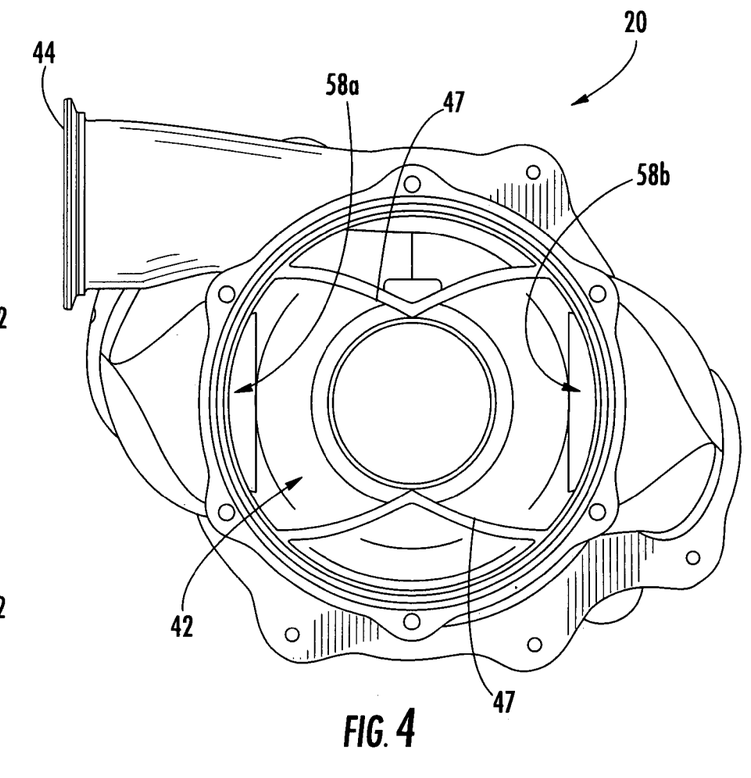
FIG. 4 is an elevation view illustrating the compressor housing of FIG. 2, as seen from the right side of FIG. 3.
Figures 6, 7:
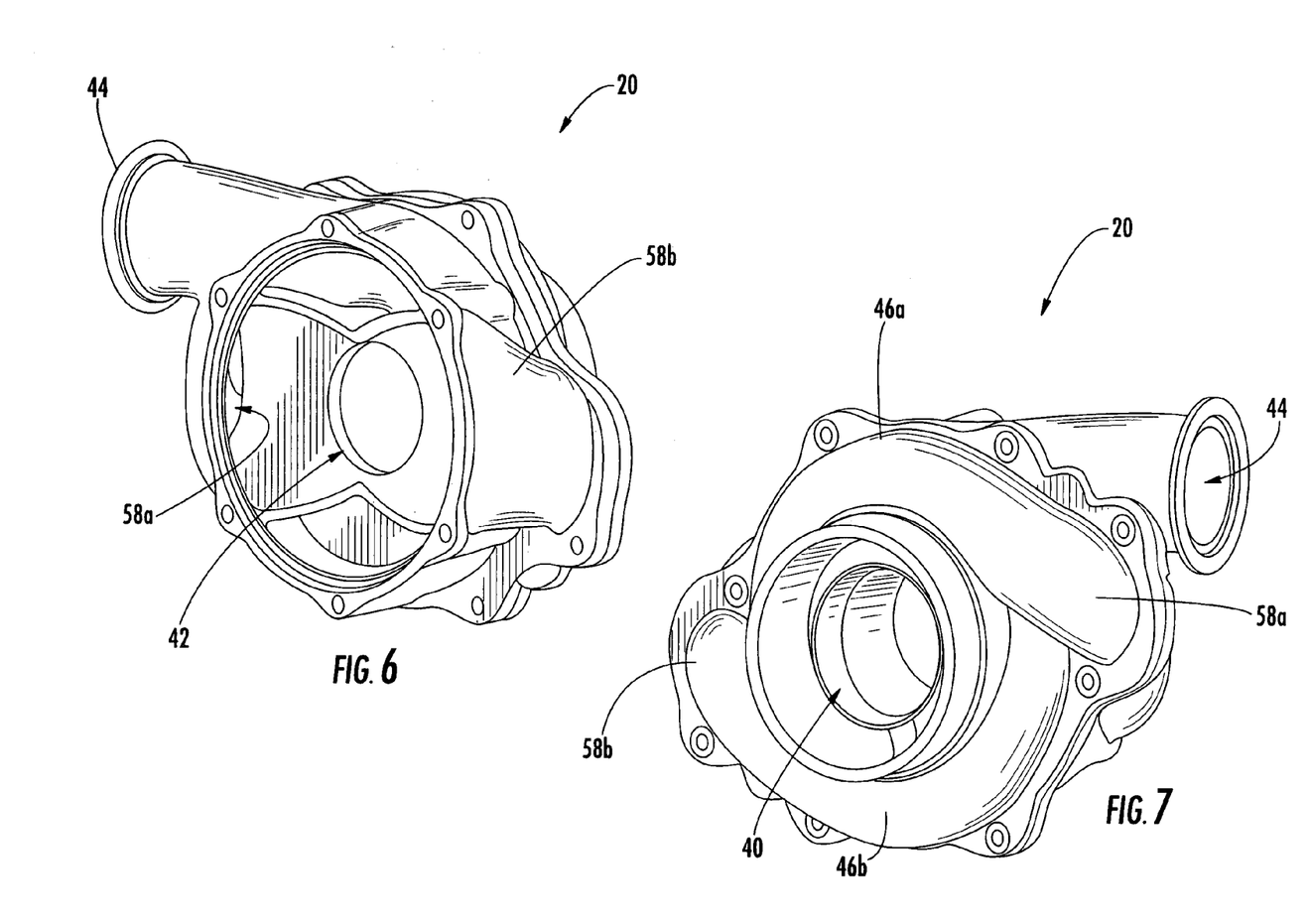
FIGS. 6 and 7 are perspective views illustrating the compressor housing of FIG. 2.

Referring now to the configuration of the volutes 46, 48, it is shown in FIGS. 1, 2, and 7 that the first-stage volute 46 includes first and second segments or portions 46a, 46b. Each portion 46a, 46b extends about 180 degrees around the wheel 16 and is fluidly connected to the second-stage inlet 42 by a respective one of two passages 58a, 58b or conduits. Each passage 58a, 58b extends axially between the first-stage volute 46 and the second-stage inlet 42 and passes radially outward of the second-stage volute 48.

The configuration of the first- and second-stage volutes 46, 48 and the passages 58a, 58b is further illustrated in FIGS. 9–12, each of which illustrates, in solid form for purposes of illustrative clarity, the voids defined by a portion of the flow path through the compressor and, in particular, the voids defined by only the volutes 46, 48 and passages 58a, 58b. In this regard, it is noted that the terms "volute," "passage," and "diffuser" are used herein to refer to the corresponding structures as well as the voids or spaces defined thereby. As illustrated, the second-stage volute 48 can extend substantially continuously and annularly around the aperture 18 of the housing 20. Typically, the second-stage volute 48 defines an increasing cross-sectional size in the direction of the flow of the gas therethrough. The outlet 44 from the second-stage volute 48 can extend in a generally tangential direction outward from the second-stage volute 48. Similarly, the first-stage volute 46 can extend continuously in an annular configuration, with each portion 46a, 46b of the first-stage volute 46 extending approximately 180 degrees. Each portion 46a, 46b of the first-stage volute 46 can also have a cross-sectional size that increases in the direction of the flow of the gas, i.e., toward a respective one of the passages 58a, 58b extending therefrom to the second-stage inlet 42. Thus, the speed of the gas can be reduced in the volutes 46, 48.

As noted above, the second-stage volute 48 is typically positioned axially between the first-stage volute 46 and the second-stage inlet 42 and each passage 58a, 58b extends axially past the second-stage volute 48 to connect the first-stage volute 46 to the second-stage inlet 42. In this regard, each passage 58a, 58b can extend from the first-stage volute 46 to a position radially outward of the second-stage volute 48 and therefrom to the second-stage inlet 42. Typically, the passages 58a, 58b extend in a substantially tangential direction from the respective portions of the first-stage volute 46, but the passages 58a, 58b can extend in a substantially radial direction adjacent the second-stage inlet 42 to reduce the swirl of the gas in the second-stage inlet 42. Further, the passages 58a, 58b can transition from a generally tubular configuration at the first-stage volute 46 to a flattened configuration at the second-stage inlet 42, i.e., a configuration having a cross-sectional size with a first dimension in a transverse direction of the compressor housing 20 that is greater than the width of the first-stage volute 46 and/or greater than a second, perpendicular dimension of each passage 58a, 58b in the axial direction.

While two passages 58a, 58b are described above for connecting the first-stage volute 46 to the second-stage inlet 42, it is appreciated that any number of passages can be provided. For example in some cases, three, four, five, or more passages can be defined, and the passages can be provided at circumferentially-spaced intervals that are uniform or non-uniform. By providing multiple passages 58a, 58b, the resistance to the flow of the gas can be reduced and a substantially uniform flow can be provided to the second-stage inlet 42. In some cases, thermal communication between the passages 58a, 58b and the second-stage volute 48 can also be minimized to decrease the heating of the gas in the passages 58a, 58b from the gas in the second-stage volute 48, which has typically undergone an additional compression operation and is therefore hotter than the gas in the passages 58a, 58b. For example, the passages 58a, 58b can be disposed at a greater distance from the second-stage volute 48, and/or the ratio of the cross-sectional size of each passage 58a, 58b to the surface area of each passage 58a, 58b can be increased, e.g., by providing a generally tubular cross-section for at least a portion of each passage 58a, 58b.

In some cases, vanes or other members can be provided in the compressor 12 for directing and/or controlling the flow of gas therethrough. For example, adjustable vanes or other adjustable members can be provided in one or both diffusers 50, 52. Adjustable vanes are further described in U.S. Pat. No. 6,665,604 to Arnold, titled "Control method for variable geometry turbocharger and related system," issued Dec. 16, 2003; U.S. Pat. No. 6,681,573 to Arnold, titled "Methods and systems for variable geometry turbocharger control," issued Jan. 27, 2004; and U.S. Pat. No. 6,679,057 to Arnold, titled "Variable geometry turbocharger," issued Jan. 20, 2004, all of which are assigned to the assignee of the present application. Such vanes can be used to adjust the cross-sectional size of the diffusers 50, 52 during operation, as appropriate for efficient operation of the compressor 12 with varying mass flow rates therethrough. In addition, vanes or other flow members can be provided in the second-stage inlet 42 to direct the flow therein, as described in U.S. Pat. No. 6,062,028, though it is appreciated that the compressor 12 can be operated without the use of such vanes. In fact, the passages 58a, 58b can be configured to provide a substantially uniform flow over the second-stage inlet 42 without the use of vanes or other members in the flow path of the inlet 42, thereby potentially reducing the weight of the compressor 12. The contents of each of U.S. Pat. Nos. 6,665,604; 6,681,573; 6,679,057; and 6,062,028 are incorporated herein in their entirety by reference.

In operation according to one embodiment of the present invention, a gas such as air is successively compressed in the first and second stages 38a, 38b of the compressor 12. In particular, the gas is received through the first-stage inlet 40 to the first set of blades 34a of the compressor wheel 16, i.e., the first stage of the wheel 16. As the compressor wheel 16 rotates, the gas is compressed to a first pressure and delivered to the first-stage volute 46. The gas circulates from the first-stage volute 46 through the first and second passages 58a, 58b and therefrom through the second-stage inlet 42 in a generally axial direction to the second set of blades 34b of the wheel 16, i.e., the second stage of the wheel 16. In particular, the gas circulates through each passage 58a, 58b in a path that extends radially outward beyond the second-stage volute 48 and from the first-stage volute 46 to a position axially opposite the second-stage volute 48 from the first-stage volute 46. The gas can enter the second stage 38b in an axial direction that is opposite the direction of the gas entering the first stage 38a. The gas is then compressed again and delivered at a second pressure to the second-stage volute 48.

Figures 11, 12:
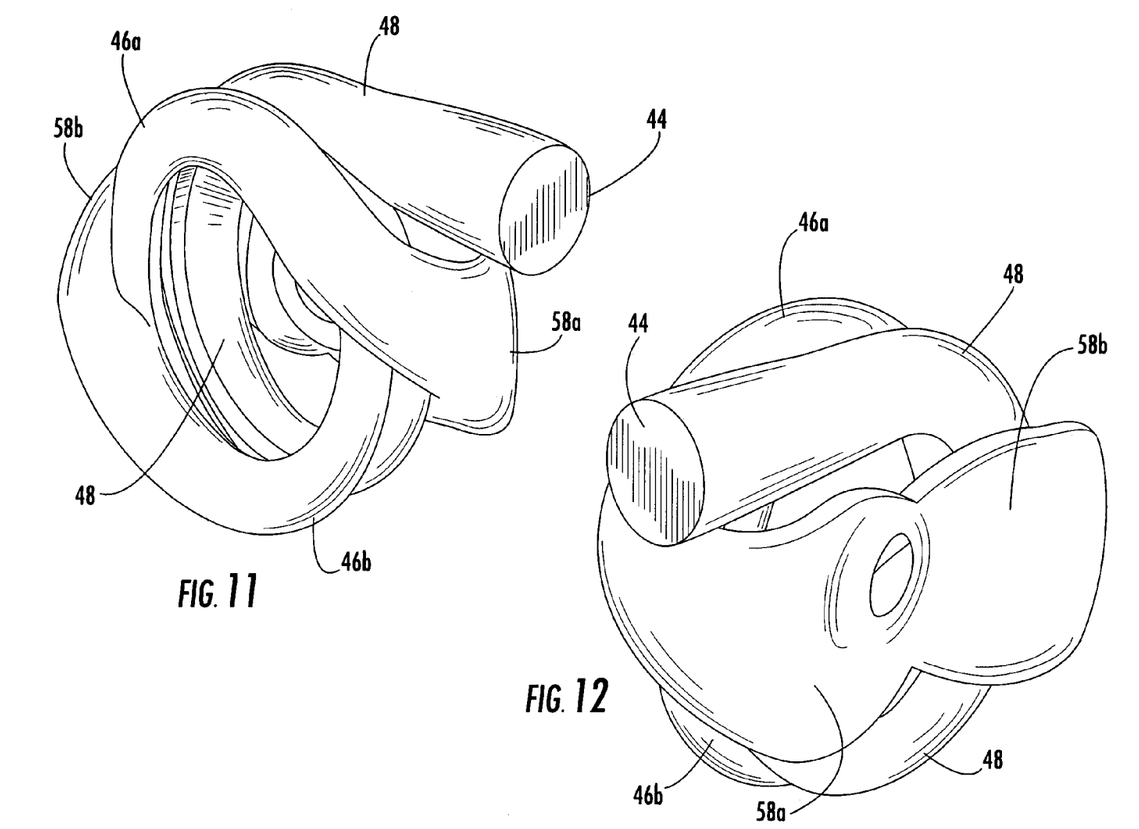
FIGS. 11 and 12 are perspective views illustrating the model of the flow path of the compressor housing of FIG. 2.

As noted above, the flow can be provided substantially uniformly to the second stage inlet 42, and the flow can be provided to the inlet 42 with reduced swirl. In this regard, it is noted that while each passages 58a, 58b extends generally tangentially from the corresponding portion 46a, 46b of the first-stage volute 46, each passage 58a, 58b can turn to the axial direction (or a nearly axial direction) as illustrated in FIG. 11 so that a circumferential velocity (or swirling) of the gas is reduced. Further, the passages 58a, 58b can then turn to direct the flow in a radial direction (or nearly radial direction) inward toward the second-stage inlet 42. Thus, the gas can enter the second-stage inlet 42 with reduced swirl.

Figures 9, 10:
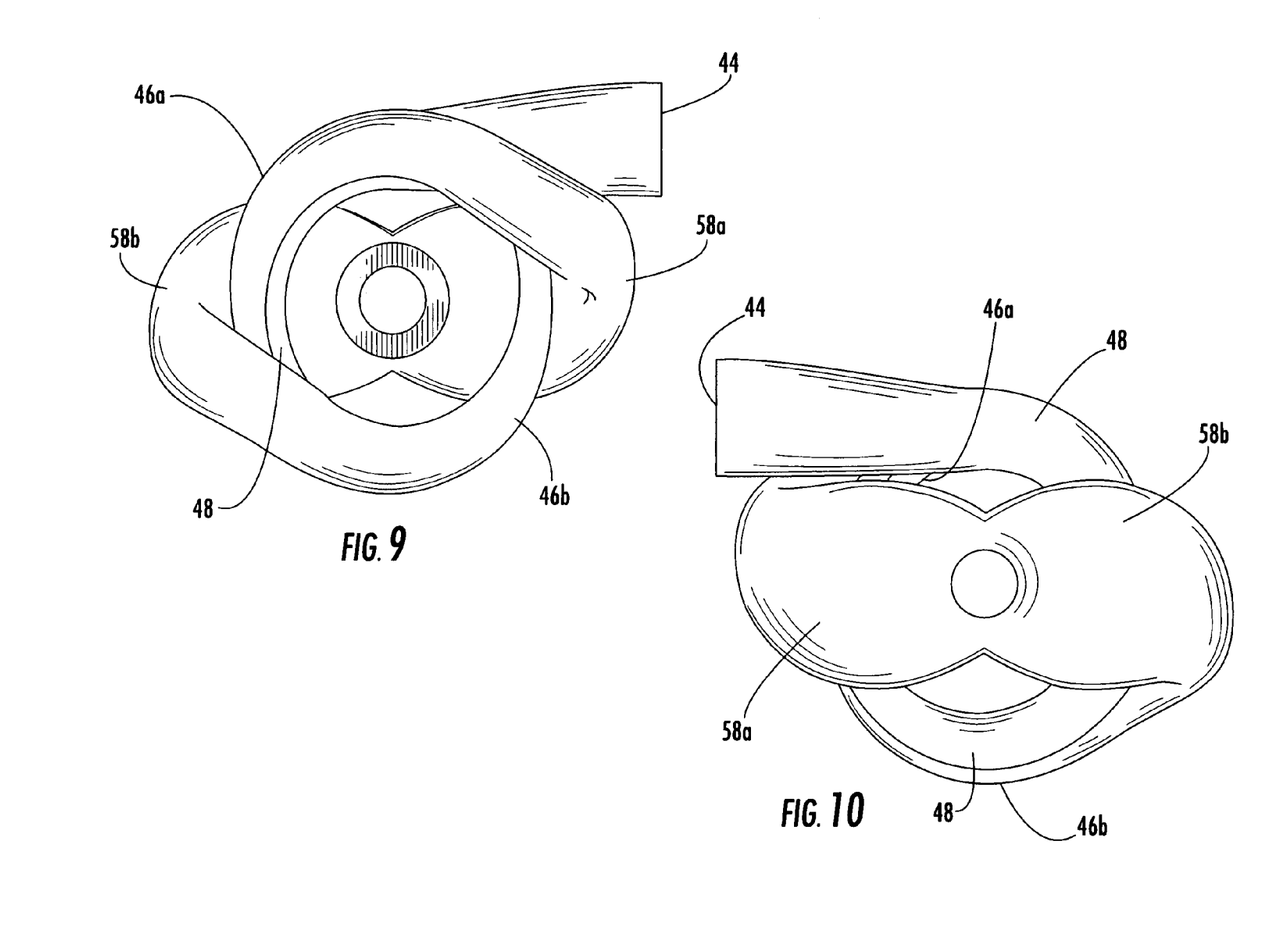
FIGS. 9 and 10 are elevation views illustrating a model of the flow path of the compressor housing of FIG. 2.
Figure 13:
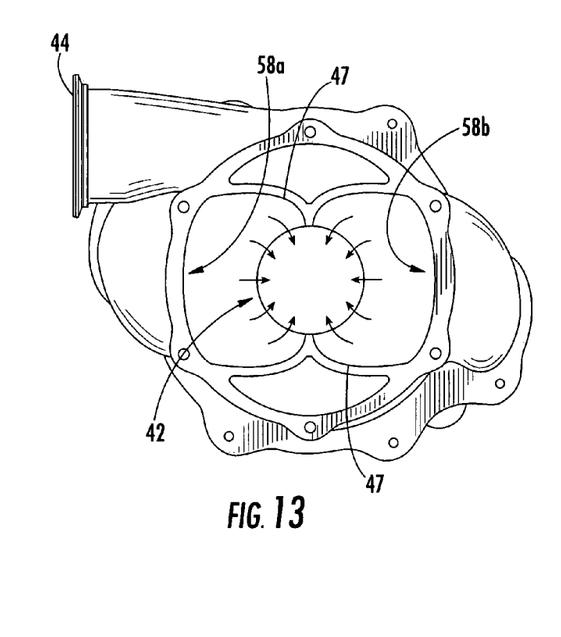
FIG. 13 is an elevation view illustrating a compressor housing according to another embodiment of the present invention.
Figure 14:
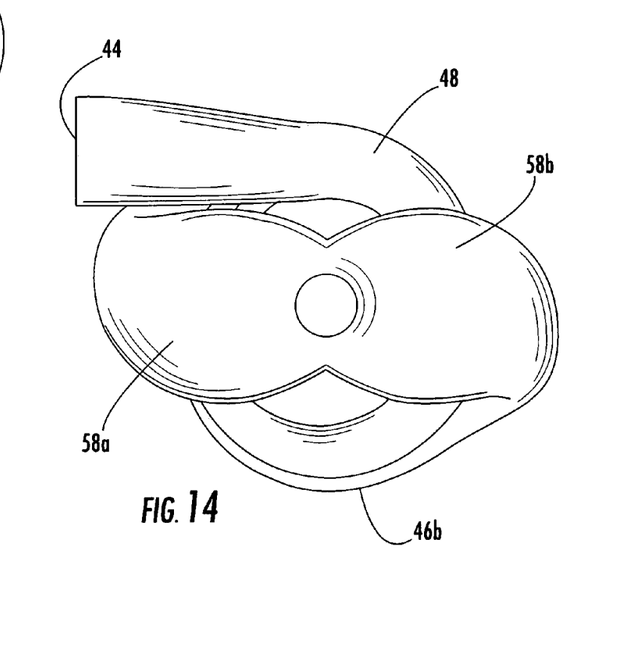
FIG. 14 is an elevation view illustrating a model of the flow path of the compressor housing of FIG. 13.

As illustrated in FIG. 10, the passages 58a, 58b can spread the flow about the circumference of the second-stage inlet 42 so that the gas enters the second-stage inlet 42 with substantially uniform pressure and velocity. For example, the passages 58a, 58b can define a width that is greater than the diameter of the second-stage inlet, and walls 59 defining the passages 58a, 58b can be curved to direct the gas radially inward. Further, it is appreciated that the configuration of the passages 58a, 58b can be designed, at least in part, according to the desired flow into the second-stage inlet 42. In some cases, the angle and curvature of the walls 59 defining the passages 58a, 58b can be configured according to the desired flow to the second-stage inlet 42. For example, FIGS. 13 and 14 illustrate an embodiment in which the walls 59 of the passages 58a, 58b define a curve of about 90 degrees. Thus, as indicated in FIG. 13, the gas flowing through the passages 58a, 58b is directed generally radially inward to the second-stage inlet 42 with little swirling and with substantially uniform pressure and velocity.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
   a center housing defining a bore extending therethrough in an axial direction, with bearings mounted in the bore and a rotatable shaft supported in the bearings, the shaft having opposite ends, the center housing having axially opposite sides;
   a compressor wheel mounted on one end of the shaft;
   a turbine wheel mounted on the other end of the shaft;
   a compressor housing enclosing the compressor wheel and having opposite first and second sides, the second side mounted to one of the sides of the center housing;
   a turbine housing mounted to the other side of the center housing enclosing the turbine wheel, the turbine housing defining an annular chamber surrounding the turbine wheel for receiving exhaust gas and directing the exhaust gas radially inwardly into the turbine wheel, the turbine housing defining an outlet for the exhaust gas extending in the axial direction away from the center housing;
   the compressor wheel having a first-stage impeller and a second-stage impeller arranged back-to-back;
   the compressor housing defining a first-stage inlet extending in the axial direction into the first side of the compressor housing for supplying air into the first-stage impeller, and defining a second-stage inlet extending opposite to the axial direction into the second side of the compressor housing for supplying air into the second-stage impeller;
   the compressor housing defining a generally annular first-stage volute surrounding the first-stage impeller for receiving air discharged therefrom, a generally annular second-stage volute surrounding the second-stage impeller for receiving air discharged therefrom, and an outlet conduit connected to the second-stage volute and extending generally tangentially outward therefrom; and the compressor housing defining two separate passages connecting the first-stage volute to the second-stage inlet, each of the passages extending radially outward of the second-stage volute.

2. The turbocharger of claim 1, wherein a portion of each passage extending radially inwardly to the second-stage inlet is defined between a wall of the compressor housing and a wall of the center housing.

3. The turbocharger of claim 1, wherein the first-stage volute defines at least two portions, each portion extending between two of the passages and having a cross-sectional size that increases in a direction toward a respective one of the passages extending generally tangentially therefrom.

4. The turbocharger of claim 1, wherein a cross-sectional size of the second-stage volute increases in a direction toward the outlet conduit.

5. The turbocharger of claim 1, wherein the first-stage volute comprises two generally semi-annular segments that collectively substantially encircle the first-stage impeller, one of the passages being connected to one of the segments and the other of the passages being connected to the other of the segments.

6. The turbocharger of claim 1, wherein the compressor housing is formed in two separate first and second sections, the first section defining the first-stage volute and a first portion of each of the passages, and the second section defining the second-stage volute and a second portion of each of the passages, the first and second sections being connected to each other at a joint.

7. The turbocharger of claim 6, further comprising a baffle formed separately from and disposed between the first and second sections of the compressor housing, the baffle separating the first-stage volute from the second-stage volute.

* * * * *